United States Patent [19]
Pan

[11] Patent Number: 5,726,801
[45] Date of Patent: Mar. 10, 1998

[54] REDUCED OPTICAL ISOLATOR MODULE FOR A MINIATURIZED LASER DIODE ASSEMBLY

[75] Inventor: Jing-Jong Pan, Milpitas, Calif.

[73] Assignee: E-Tek Dynamics, Inc., San Jose, Calif.

[21] Appl. No.: 361,604

[22] Filed: Dec. 21, 1994

[51] Int. Cl.$^6$ ............... G02B 5/30; G02B 27/28
[52] U.S. Cl. ............... 359/484; 359/494; 359/496; 359/497; 359/499; 372/703
[58] Field of Search ............... 359/484, 494, 359/495, 496, 497, 498, 499; 372/703

[56] References Cited

U.S. PATENT DOCUMENTS

| | | | |
|---|---|---|---|
| 4,199,226 | 4/1980 | Weber et al. | 359/495 |
| 4,712,880 | 12/1987 | Shirasaki | 359/484 |
| 4,844,584 | 7/1989 | Miyagawa | 359/495 |
| 4,879,722 | 11/1989 | Dixon et al. | 372/22 |
| 4,884,276 | 11/1989 | Dixon et al. | 372/21 |
| 4,893,890 | 1/1990 | Lutes . | |
| 4,963,003 | 10/1990 | Hiiro | 359/495 |
| 5,044,713 | 9/1991 | Mozer et al. | 359/484 |
| 5,142,542 | 8/1992 | Dixon | 372/22 |
| 5,161,053 | 11/1992 | Dabbs | 359/384 |
| 5,208,876 | 5/1993 | Pan | 385/11 |
| 5,212,594 | 5/1993 | Joynes | 359/495 |
| 5,216,737 | 6/1993 | Driessen et al. | 385/34 |
| 5,263,038 | 11/1993 | Lukas et al. | 372/21 |
| 5,276,747 | 1/1994 | Pan | 385/34 |
| 5,289,313 | 2/1994 | Matsuoka | 369/110 |
| 5,359,683 | 10/1994 | Pan | 385/34 |
| 5,369,661 | 11/1994 | Yamaguchi et al. | 372/101 |
| 5,402,260 | 3/1995 | Tsuneda et al. | 359/484 |

FOREIGN PATENT DOCUMENTS

| | | | |
|---|---|---|---|
| 1141802 | 12/1962 | Germany | 359/496 |
| 54-139749 | 10/1978 | Japan | 359/484 |
| 58-130316 | 8/1983 | Japan | 359/484 |
| 0222818 | 11/1985 | Japan | 359/484 |
| 61-102621 | 5/1986 | Japan | 359/484 |
| 61-122624 | 6/1986 | Japan | 359/484 |
| 0244015 | 11/1988 | Japan | 359/484 |
| 4-77713 | 3/1992 | Japan | 359/484 |
| 5-303059 | 11/1993 | Japan | 359/484 |

*Primary Examiner*—Ricky D. Shafer
*Attorney, Agent, or Firm*—Townsend and Townsend and Crew LLP

[57] ABSTRACT

The present invention provides for a reduced isolator assembly having only two elements for a linearly polarized light source. The first element may be a birefringent crystal or a linear polarizer, such as a linear polarizer sheet, a laminated thin-film polarizer, or a polarizing beam splitter. The second element is a quarter-wave plate. The isolator blocks the light reflected back toward the polarized light source.

2 Claims, 3 Drawing Sheets

REDUCED OPTICAL ISOLATOR MODULE FOR A MINIATURIZED LASER DIODE ASSEMBLY

BACKGROUND OF THE INVENTION

The present invention relates to optical fiber network device technology and, more particularly, to optical isolators which are suitable for assembly with semiconductor lasers.

Optical isolators are common components in modern fiberoptic networks. Semiconductor lasers are typically used to generate and relay light signals on the optical fibers of such networks. These lasers are particularly susceptible to light signal reflections, which cause a laser to become unstable and noisy. Optical isolators are used to block these reflected signals from reaching the laser.

One type of optical isolator which is finding widespread use is described in U.S. Pat. No. 5,208,876 entitled, "AN IMPROVED OPTICAL ISOLATOR", which issued on May 4, 1993 to J. J. Pan and assigned to the present assignee. The described isolator has a core formed by a pair of birefringent crystal polarizers, a Faraday rotator and a permanent magnet holds the Faraday rotator. This type of isolator can be made compactly with high-performance. Insertion losses can be very low and even polarization dependent losses may be minimized.

Nonetheless, there are applications which require optical isolators even smaller. For example, if an optical isolator can be reduced in size sufficiently, a miniaturized laser diode assembly can be integrated into a source for fiberoptic amplifiers. Such devices avoid wavelength division multiplexed couplers for greater integration and ease of insertion into fiberoptic networks.

The present invention substantially solves the problem of a reduced optical isolator which is highly compact. With the reduced optical isolator, the present invention also provides for a miniaturized laser diode assembly.

SUMMARY OF THE INVENTION

The present invention provides for a optical isolator which can be reduced in size. The isolator has a quarter-wave plate and an element which receives light from a source of collimated light. The element transmits components of the light polarized in a particular plane toward the quarter-wave plate and prevents light from the quarter-wave plate not polarized in the plane from reaching the collimated light source. The element can be a birefringent crystal polarizer, a polarizing beam splitter, a sheet of linear polarizer or a laminated thin-film polarizer. In this manner the isolator prevents the source light which has been reflected back from reaching the source.

With the reduced optical isolator, the present invention provides for a semiconductor laser assembly having a laser diode for generating light, a lens for collimating the light from the laser diode, and the reduced optical isolator above. This offers an isolated laser diode assembly which is miniaturized. For optimum miniaturization, the collimating lens is an aspheric lens and the optical isolator element is a sheet of linear polarizer.

DETAILED DESCRIPTION OF PREFERRED EMBODIMENT(S)

Figure 1:
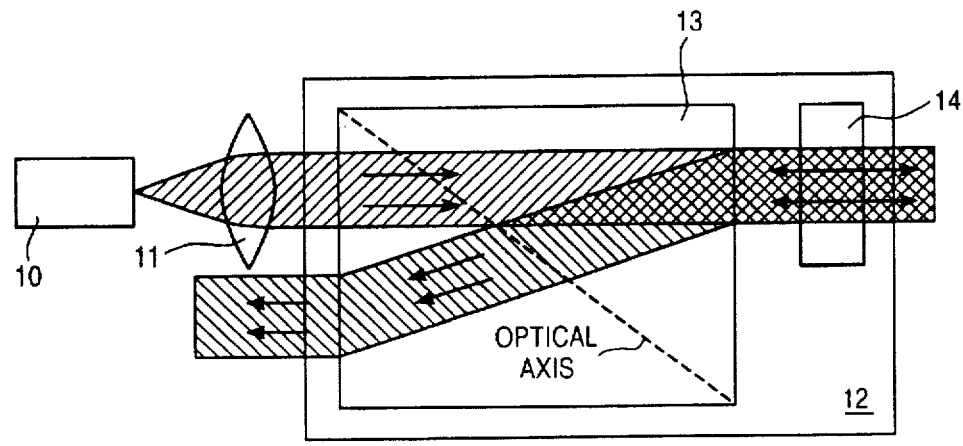
FIG. 1 is a diagram of a laser diode assembly according to one embodiment of the present invention.

FIG. 1 illustrates the general organization of a laser diode assembly with a reduced optical isolator according to the present invention. The laser diode assembly has a laser diode 10, a collimating lens 11 and a reduced optical isolator 12. Instead of two birefringent polarizers, a Faraday rotator and a permanent magnet for the Faraday rotator as found in the optical isolator described in the patent noted above, the reduced optical isolator of the present invention has merely two elements.

The first element of the reduced optical isolator receives light from the collimating lens 11. In a forward direction the first element transmits in a forward direction components of the light which are polarized in a plane and blocks light in a backward direction not polarized in the plane. The second element 14 is a quarter-wave plate.

In one embodiment of the present invention the first element in the reduced optical isolator is a birefringent crystal polarizer 13, as shown in FIG. 1. Light from the laser diode 10 is linearly polarized and collimated by the lens 11. The light is aligned with the birefringent crystal polarizer 13 so that the light maintains its polarization and propagation direction in the birefringent crystal 13. The light travels through the birefringent crystal 13 in accordance with a first index of refraction. The quarter-wave plate 14 then changes the linearly polarized light into right- (or left-) handed circularly polarized light and leaves the optical isolator.

As explained above, the light may be reflected back. In such a case, the polarization of the reflected light is reversed into left-(or right-)handed circularly polarized light. The quarter-wave plate 14 transforms the reversed circularly polarized light traveling in the backward direction to light which is linearly polarized. The plane of polarization, however, is perpendicular to the original polarization plane of the light from the laser diode 10.

Due to its orientation, the linearly polarized light travels through the birefringent crystal polarizer according to a second index of refraction of the birefringent crystal polarizer 13. Hence the light in the reverse direction does not retrace its forward path; rather, the light is deflected away from the laser diode 10, as illustrated in FIG. 1. Thus the birefringent crystal polarizer 13 blocks light in the reverse direction away from the diode 10. Materials suitable for the birefringent crystal polarizers 13 include rutile, calcite, lithium niobate, and lithium tantalate.

Figure 2A:
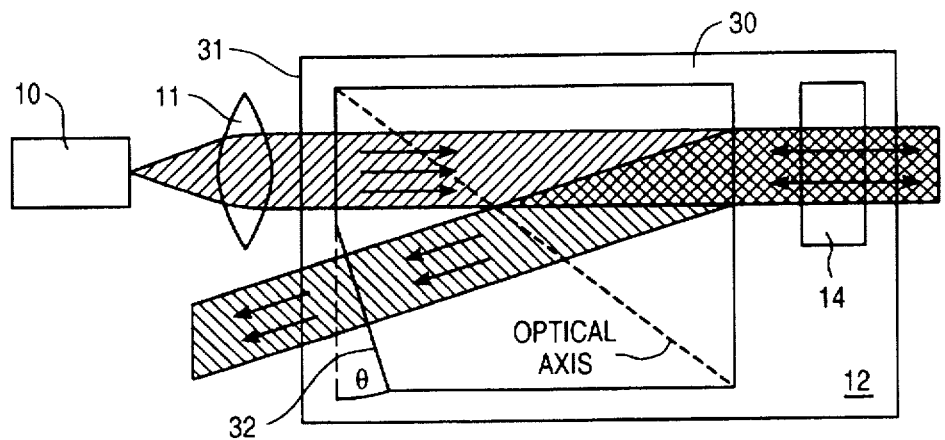
FIG. 2A is a variation of the laser diode assembly of FIG. 1 with a birefringent crystal having an end surface with two facets.

The birefringent crystal polarizer 13 of FIG. 1 has end surfaces which are parallel to each other. Light which passes through the end surfaces in the forward direction and reflected backwards remains parallel the light rays from the laser diode 10, but displaced to miss the diode. FIG. 2A shows a birefringent crystal polarizer 30 which has its end surface facing the laser diode 10 separated into two facets 31 and 32. The facet 31 remains parallel to the other end surface, while the second facet 32 is at some angle θ from the first facet 31. The arrangement of the second facet 32 helps angle the reflected light further away from the diode 10 than the arrangement of FIG. 1.

Figure 2B:
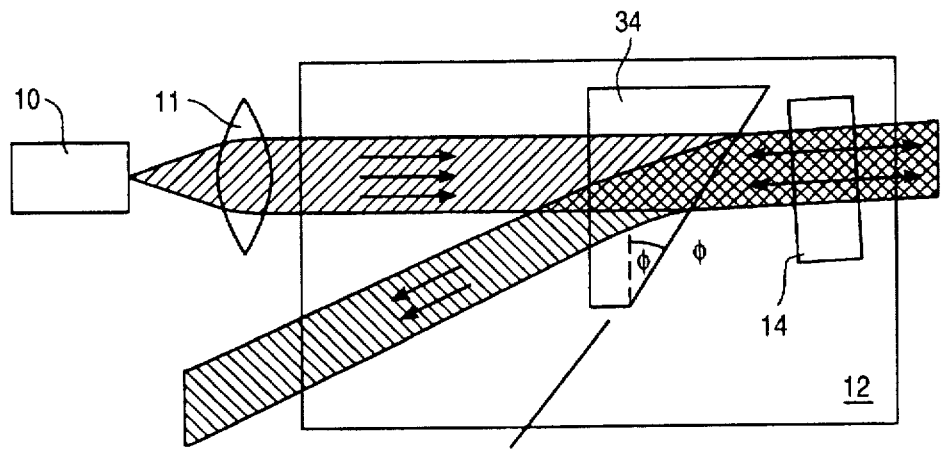
FIG. 2B is another variation of the laser diode assembly of FIG. 1 with a wedge-shaped birefringent crystal.

In FIG. 2B the end surfaces of the birefringent crystal polarizer 34 are no longer parallel. The polarizer 34 is wedge-shaped with the end surface toward the laser diode 10 aligned as the parallel end surfaces of the crystal polarizer 13 in FIG. 1. However, the end surface of the polarizer 34 toward the quarter-wave plate is slanted at an angle φ, as shown in FIG. 2B. This angle helps direct the reflected light even further away from the diode 10. It should be noted that the arrangement of the quarter wave-plate 14 is also modified slightly and the light in the forward direction from the plate 14 is no longer parallel to the light from the laser diode 10.

Other replacements for the birefringent crystal polarizer also include a linear polarizer, which operates in the same manner as a birefringent crystal polarizer. The linear polarizer is aligned with respect to the linear polarized light from a source laser diode so that the light is transmitted through to the quarter-wave plate. The quarter-wave plate changes the linearly polarized light into light circularly polarized in one direction. If the light is reflected back toward the optical isolator, the quarter-wave plate transforms the light now circularly polarized in the opposite direction into linearly polarized light having a plane of polarization 90° to that of the light from the laser diode and of the linear polarizer. Thus the reflected light is blocked by the linear polarizer from the laser diode.

Figure 3:
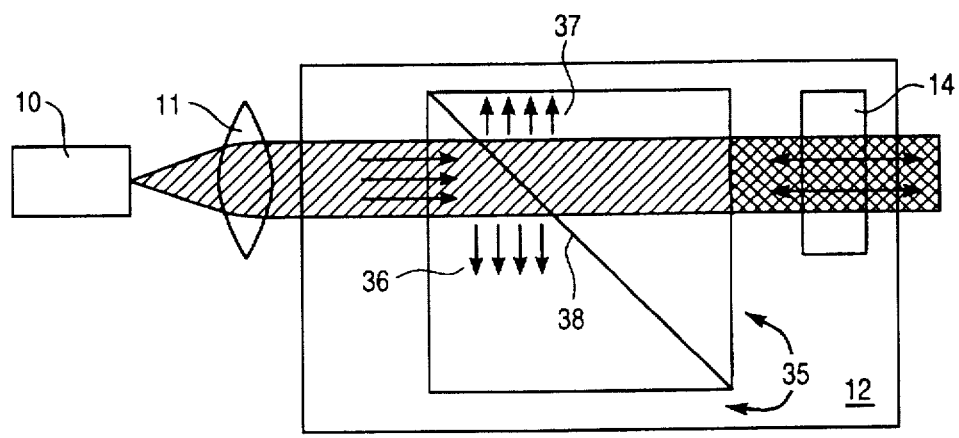
FIG. 3 is still another variation of the laser assembly of FIG. 1 with a polarizing beam splitter.

Linear polarizers include natural materials, such as tourmaline, and polarizer beam splitters, such as those constructed from two right-angle prisms. In FIG. 3 a polarizing beam splitter 35 is used for the first element in place of the birefringent crystal polarizer 13 in FIG. 1. The polarization beam splitter 35 is formed from a pair of right angle prisms 36 and 37. The face of the hypotenuse of one prism 36 is bonded to the hypotenuse face of the second prism 37 with special dielectric materials to form a polarizing beam splitter cube with an internal interface 38 at an angle 45° to the external faces of the cube. Light which is linearly polarized in the plane of incidence is transmitted through the cube. Light which is linearly polarized perpendicularly to the plane of incidence is reflected by the cube.

However, perhaps the best linear polarizers in terms of optical performance, size and convenience are commercial linear polarizer sheet products, such as Polarcor, which is a trademark of Corning Corporation of Corning, N.Y., and laminated thin-film polarizers.

Figure 4:
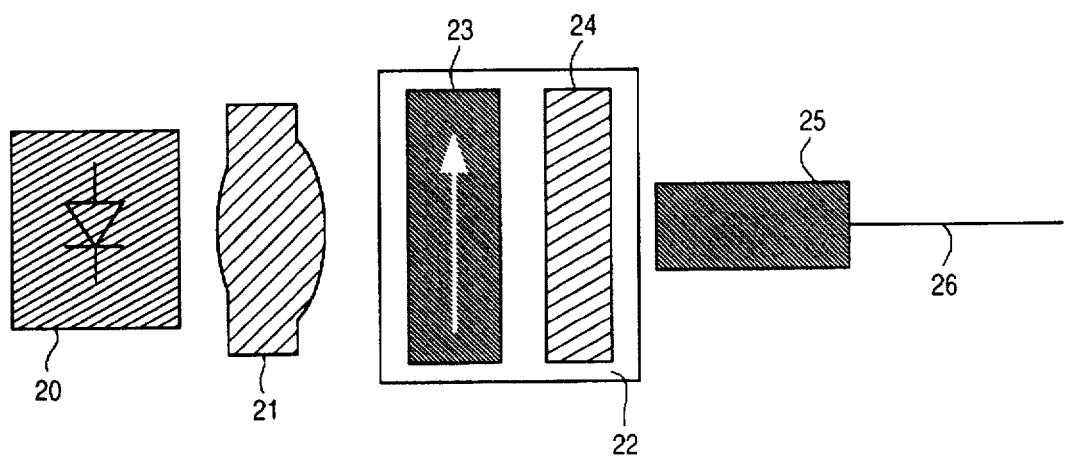
FIG. 4 is a diagram of a laser diode assembly according to another embodiment of the present invention.

A highly miniaturized laser diode assembly using a reduced optical isolator with a linear polarizer is illustrated in FIG. 4. The assembly has a laser diode 20, an aspheric lens 21 and an optical isolator 22 with a linear polarizer 23 and a quarter-wave plate 24. An quarter-pitch GRIN lens or a conventional homogeneous lens could be used as a collimator in place of the aspheric lens 21. However, the aspheric lens occupies a smaller space and has a much shorter focal length than a GRIN lens. Furthermore, the aspheric lens 21 has much less aberrations than a conventional homogeneous lens.

Similarly a sheet of linear polarizer, Polarcor, is used for the linear polarizer 23, instead of bulkier linear polarizers.

To transmit the light from the laser diode assembly to an optical fiber, a quarter-pitch GRIN lens 25 can be used, as shown in FIG. 4, to refocus the collimated light from the quarter-wave plate 24 to a point, the core of an optical fiber 26.

Figure 5:
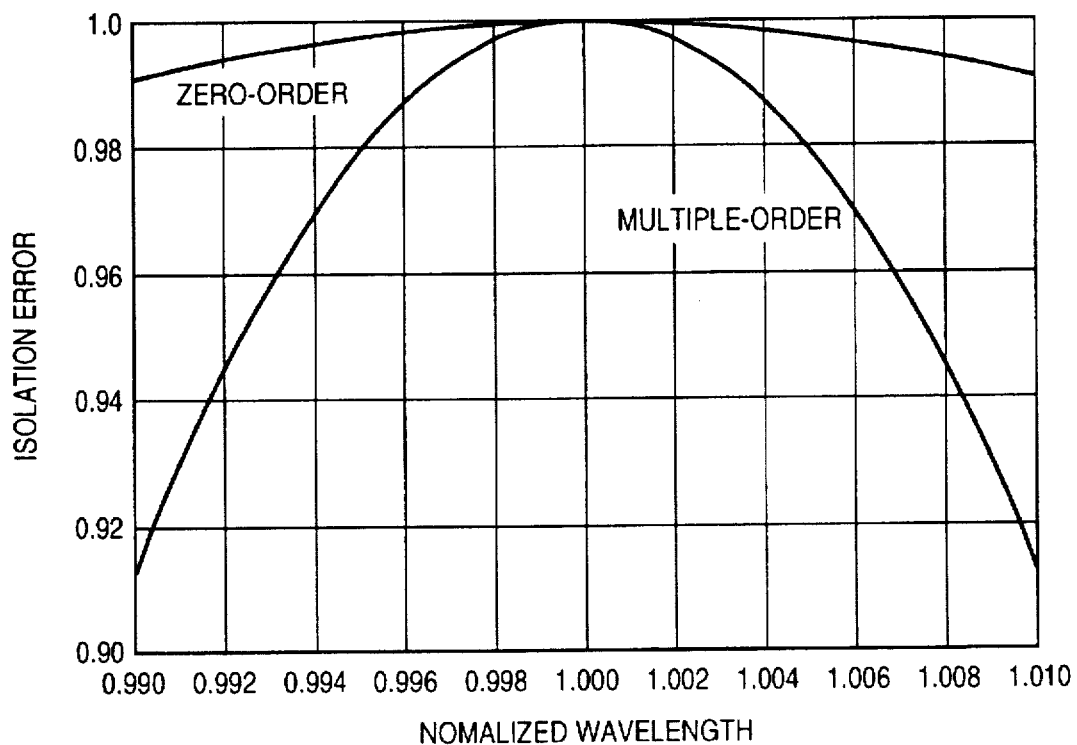
FIG. 5 is a graph of isolation error versus laser diode wavelength of different wavelengths for zero-order and multiple order waveplates.

FIG. 5 illustrates the performance of the quarter-wave plate by a graph of isolation error versus laser diode wavelength of zero-order and multiple order waveplates. Basically a zero-order waveplate has less wavelength dependency compared to a less expensive, multiple order waveplate. A zero-order waveplate also has less temperature wavelength dependency than a multiple order waveplate. Thus if cost is paramount, one can select a multiple order waveplate for the quarter-wave plate; if performance is paramount, the zero-order waveplate is selected.

While the above is a complete description of the preferred embodiments of the present invention, various alternatives, modifications and equivalents may be used. It should be evident that the present invention is equally applicable by making appropriate modifications to the embodiment described above. For example, while the reduced optical isolator has described in the context of a source of linearly polarized light, i.e., the laser diode, the isolator could be used to isolate a non-polarized light source. Of course, in such a situation size would likely be paramount over optical performance. Insertion loss would be high. Therefore, the above description should not be taken as limiting the scope of invention which is defined by the metes and bounds of the appended claims.

What is claimed is:

1. An assembly for a semiconductor laser comprising a laser diode for generating light;

an aspheric lens collimating said light directly from said laser diode;

a quarter-wave plate; and a birefringent crystal receiving light directly from said aspheric lens for transmitting a component of said light polarized in a plane toward said quarter-wave plate and for preventing light from said quarter-wave plate not polarized in said plane from reaching said aspheric lens and said laser diode, said birefringent crystal having a first end surface and a second end surface, said first end surface having a first facet parallel to said second end surface and a second facet at an angle to said first facet;

whereby light from said laser diode transmitted through said quarter-wave plate and reflected back is isolated from said laser diode.

2. An assembly for a semiconductor laser comprising a laser diode for generating light;

a GRIN lens collimating said light directly from said laser diode;

a quarter-wave plate; and a birefringent crystal receiving light directly from said GRIN lens for transmitting a component of said light polarized in a plane toward said quarter-wave plate and for preventing light from said quarter-wave plate not polarized in said plane from reaching said GRIN lens and said laser diode, said birefringent crystal having a first end surface and a second end surface, said first end surface having a first facet parallel to said second end surface and a second facet at an angle to said first facet;

whereby light from said laser diode transmitted through said quarter-wave plate and reflected back is isolated from said laser diode.

* * * * *